Figure 1:
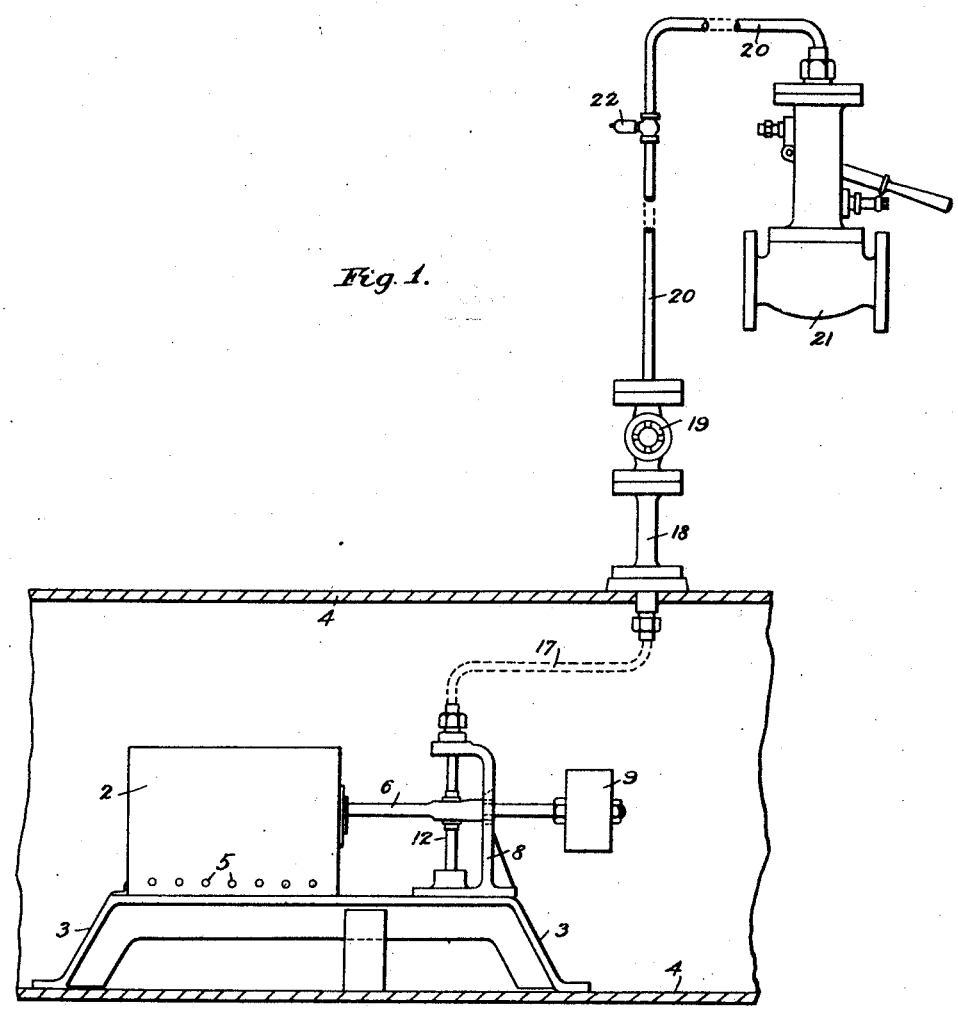

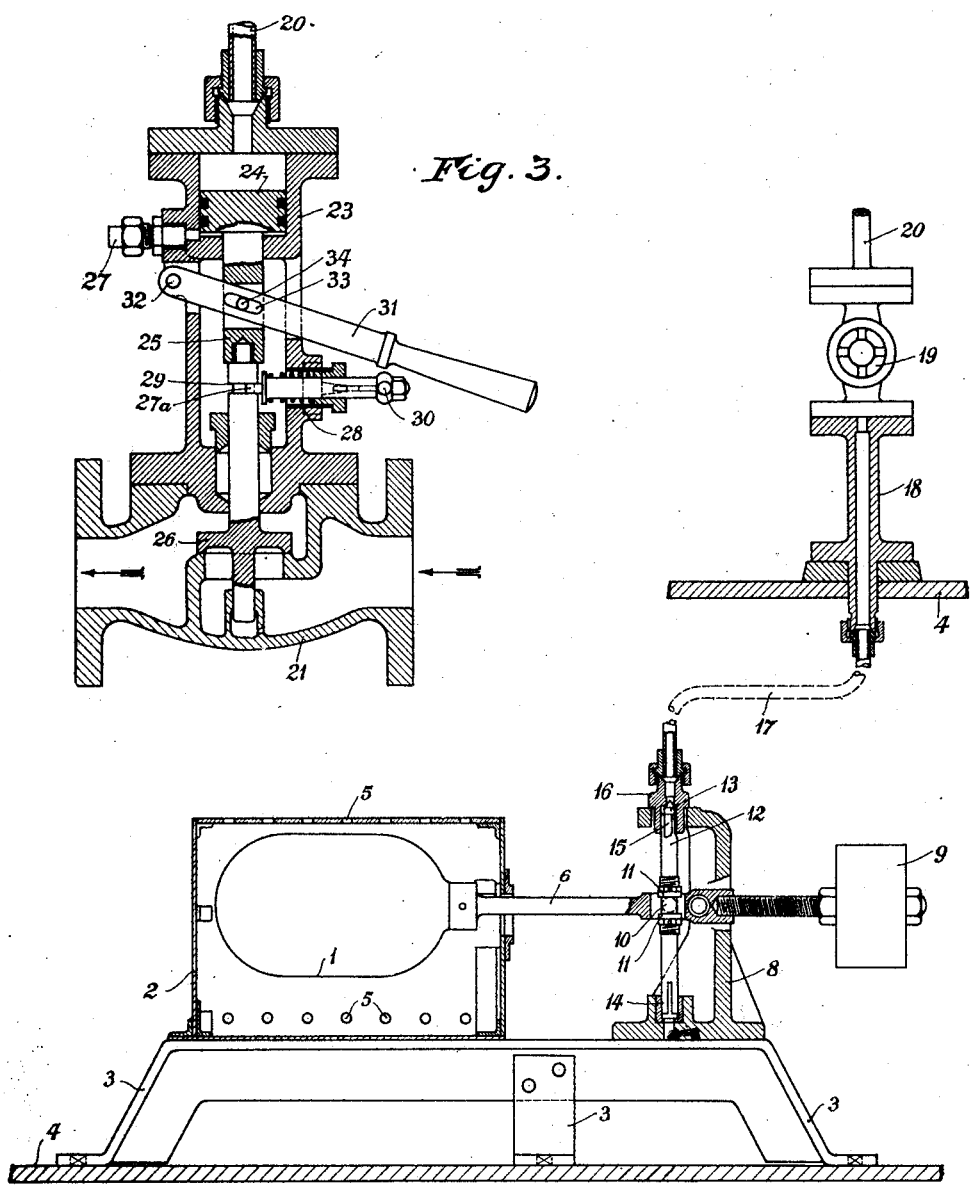

Patented Mar. 29, 1932

1,851,924

UNITED STATES PATENT OFFICE

CECIL GRAHAM RAMSAY, OF LIVERPOOL, ENGLAND

CONTROL OF THE FUEL INJECTION IN WATER TUBE BOILERS

Application filed May 10, 1930, Serial No. 451,413, and in Great Britain July 4, 1929.

In water tube boilers fitted with an injected fuel supply it has been proposed automatically to control the fuel injection when the water level in the steam drum of the boiler fell below a certain height. This was effected by means of a float mounted in an auxiliary chamber at the side of the steam drum and communicating therewith so that the level of water therein should correspond to the level of water in the steam drum. In in the case of a marine boiler, however, owing to the rolling or pitching of the ship the level of the water in the auxiliary chamber would not always be the same as in the steam drum and owing to the comparatively small reserve of water in such boilers and the speed at which the water level is apt to fall serious damage is possible in such an arrangement.

According to the present invention the float is mounted in the steam drum itself of the boiler, the float being arranged to control the opening or closing of a small valve, preferably a needle valve, as the float falls or rises due to fluctuations of water level in the steam drum. When the float falls below some predetermined normal level the needle valve opens admitting steam to a cylinder the piston in which is connected to and operates the fuel supply valve, closing such valve and shutting off the fuel supply to the furnace. A locking mechanism, say of the spring controlled type, retains the fuel valve in the closed position until it is again opened manually by a lever or otherwise. A whistle or similar alarm is inserted in the steam pipe leading from the float controlled needle valve so that an audible warning is given when the water in the steam drum falls below the normal level and the fuel supply is shut off. Or the invention may be arranged to control the admission of a quenching medium to a coal fired boiler.

Apparatus in accordance with this invention is illustrated in the accompanying drawings in which Fig. 1 is a diagrammatic general arrangement of the float controlling needle valve mechanism in the steam drum and its connection to the fuel supply valve, Fig. 2 being a section to a larger scale of the float controlled valve mechanism and cut off valve and Fig. 3 is a section of the fuel supply valve.

The float 1 is disposed within a casing or surge drum 2 mounted upon a stand 3 within the steam drum 4 of the boiler. The surge drum 2 is perforated at 5 and acts to shield the float from water movements set up by violent ebullition or surge of the water in the steam drum due to the motion of a vessel. The height of the float in the steam drum 4 relatively to the predetermined low water level at which the apparatus is adapted to act, may be adjusted by varying the height of the stand 3. The float is carried on a lever 6 pivoted at 7 in a bracket 8 on the stand and the outer end of the lever is fitted with an adjustable counterpoise 9. Pins 10 on the float arm 6 engage collars 11 on the spindle 12 of a needle valve 13. The lower end of the spindle 12 is guided in a footstep 14 and flats 15 are formed at the top of the valve spindle so that while the spindle is efficiently guided in the bush 16 the flats form ports for the entrance of the steam past the needle valve when the latter opens. A small pipe 17 couples the needle valve seating to a branch 18 on the exterior of the steam drum 4, to which branch is connected a valve 19 for cutting out the device when required. This valve 19 is connected by a pipe 20 to a fuel control valve 21 through which passes the supply of injected fuel, liquid or pulverized. In the pipe 20 a whistle 22 is provided. The pipe 20 leads to a cylinder 23 on the valve 21 within which is mounted a piston 24 connected to the spindle 25 of the fuel supply valve 26. A drain 27 is provided for the lower part of the cylinder and a locking device in the form of a fork 27a controlled by a spring 28 is adapted to engage a groove 29 in the valve spindle and hold the valve 26 in the closed position when once shut. The fuel valve can then only be reopened by releasing the spring controlled fork 27a, pulling out the handle 30, and raising the valve 26 by means of the hand lever 31, pivoted at 32, a slot 33 in the lever engaging a pin 34 on the valve spindle.

In operation, while the water in the steam drum remains at or above some predetermined normal level, the buoyancy of the float 1 keeps the needle valve 13 closed and fuel will continue to be delivered to the furnace through the open valve 26. Should, however, the water in the steam drum fall below such normal level at which the float has been set to operate, the float 1 falls and opens the needle valve 13 admitting steam by way of the pipe 17, valve 19 and connecting pipe 20 to the cylinder 23, the piston 24, in which is forced down closing the valve 26 and shutting off the fuel supply. Simultaneously the spring forked catch 27a has engaged the groove 29 thus retaining the valve in its closed position, and at the same time, due to the passage of the steam along the pipe 20, the whistle 22 is sounded, an audible warning being thus given to the attendant in charge of the boiler. The fuel valve 26 can then only be reopened by a manual operation of the lever 31.

The float, surge chamber and needle valve mechanism and the stand 3 are preferably made in the form of a self-contained unit of such compact size that the unit may be inserted or removed through the usual manhole on the steam drum.

Obviously the invention with slight modifications could be applied to controlling the supply of a quenching medium to a coal fired boiler, instead of controlling the supply of oil or pulverized fuel in the way described.

By fitting a controlling device of the type described within the steam drum the apparatus is operated by fluctuations of the water level in the drum itself, thus avoiding the additional expense of fitting an auxiliary chamber outside the steam drum with the necessary spindles and packed glands and at the same time securing a more efficient and sensitive action of the apparatus; and by providing a locking device for retaining the fuel valve in its closed position after it has been operated by the apparatus a safeguard is provided against possible flooding of the boiler furnace with fuel until such time as the boiler would be again ready for steaming.

I claim:

1. Means for controlling the fuel supply to a water tube boiler, comprising in combination a float actuated mechanism disposed within the steam drum of the boiler, said steam drum, a needle valve in the steam drum operated by the float to admit steam to a fuel control valve, a fuel control valve closed by the action of the float mechanism when the water in the steam drum falls below a predetermined level, and a pipe coupling the needle and fuel valves.

2. Means for controlling the fuel supply to a water tube boiler comprising in combination, a float, a surge chamber enclosing the float and disposed within the steam drum of the boiler, said steam drum, a needle valve in the steam drum operated by the float to admit steam to a fuel control valve, a fuel control valve closed by the action of the float mechanism when the water in the steam drum falls below a predetermined level, a pipe coupling the needle and fuel valves, and means for retaining the fuel valve in the closed position.

3. Means for controlling the fuel supply to a water tube boiler comprising in combination a float, a surge chamber enclosing the float and disposed within the steam drum of the boiler, said steam drum, a pivoted lever carrying the float and engaging a needle valve, said needle valve admitting steam to a fuel control valve, a fuel control valve closed by the action of the float when the water in the steam drum falls below some predetermined level, and a pipe coupling the needle and fuel valves.

4. Means for controlling the fuel supply to a water tube boiler comprising in combination a float actuated mechanism disposed within the steam drum of the boiler, said steam drum, a needle valve in the steam drum operated by the float to admit steam to and close a fuel control valve, said fuel valve comprising a cylinder communicating with the needle valve, and a piston in said cylinder operatively connected to the fuel valve, a spring controlled device for retaining the fuel valve in its closed position and means for reopening the fuel valve.

5. Means for controlling the fuel supply to a water tube boiler comprising in combination a float mechanism disposed within the steam drum of the boiler, said steam drum, a needle valve in the steam drum operated by the float to admit steam to and close a fuel control valve, said fuel control valve, a pipe coupling the needle and fuel valves, and an audible signalling device in said pipe actuated by the passage of steam therethrough to close the fuel valve, means for retaining the fuel valve in its closed position, and a lever connected to the fuel valve for reopening the valve manually.

In testimony whereof I affix my signature.

CECIL GRAHAM RAMSAY.